United States Patent

Tsukada et al.

[11] Patent Number: 5,099,471
[45] Date of Patent: Mar. 24, 1992

[54] ULTRASHORT OPTICAL PULSE MODULATING EQUIPMENT

[75] Inventors: Masato Tsukada, Hachioji; Yoshihiro Shimazu, Kawasaki, both of Japan

[73] Assignee: Nippon Telegraph and Telephone Corporation, Tokyo, Japan

[21] Appl. No.: 512,202

[22] Filed: Apr. 20, 1990

[30] Foreign Application Priority Data

Apr. 24, 1989 [JP] Japan .................. 1-101730

[51] Int. Cl.$^5$ .......................... H04J 3/00; H04J 14/00
[52] U.S. Cl. .................. 359/135; 370/109; 250/227.12; 359/184;
[58] Field of Search .......... 370/4, 2, 1, 109; 455/608, 609; 250/227.12; 330/4.3; 381/34; 350/96.15

[56] References Cited

U.S. PATENT DOCUMENTS

| | | | |
|---|---|---|---|
| 3,532,890 | 10/1970 | Denton | 370/2 |
| 3,604,936 | 9/1971 | Kompfner | 370/4 |
| 4,410,981 | 10/1983 | Flory | 370/109 |
| 4,856,092 | 8/1989 | Wade | 455/609 |
| 4,866,698 | 9/1989 | Huggins et al. | 370/1 |
| 4,928,316 | 5/1990 | Heritage et al. | 455/608 |
| 4,959,540 | 9/1990 | Fan et al. | 250/227.12 |

FOREIGN PATENT DOCUMENTS 0282071 9/1988 European Pat. Off.
85/04064 9/1985 World Int. Prop. O.

Primary Examiner—Reinhard J. Eisenzopf
Assistant Examiner—Kinfe-Michael Negash
Attorney, Agent, or Firm—Pollock, VandeSande and Priddy

[57] ABSTRACT

In ultrashort optical pulse modulating equipment optical pulses emitted from a laser in synchronism with input electrical signals are modulated by the electrical signals, the modulated optical pulses are applied to a first-stage pulse interval compressor, in which they are alternately distributed, one by one, by an optical switch to two optical fiber delay lines, two modulated optical pulses delayed by the two optical fiber delay lines are brought close to each other, and modulated optical pulse groups, each composed of two closely spaced modulated optical pulses, are output from an optical coupler. Also in the next-stage pulse interval compressor the modulated optical pulse groups input thereinto are alternately distributed, one by one, by an optical switch to two optical fiber delay lines, in which predetermined delays are caused in the modulated optical pulse groups, respectively, and then they are coupled together by an optical coupler, thereby creating modulated optical pulse groups each composed of four modulated optical pulses. In this way, modulated optical pulse groups are applied to n cascade-connected pulse interval compressors one after another, in which they are brought close to each other two by two and then coupled together, thereby producing modulated optical pulse packets compressed as desired.

6 Claims, 9 Drawing Sheets

ULTRASHORT OPTICAL PULSE MODULATING EQUIPMENT

BACKGROUND OF THE INVENTION

This invention relates to ultrashort optical pulse modulating equipment which permits high multiplexing of optical pulses and, more particularly, to ultrashort optical pulse modulating equipment which affords reduction of optical power loss and of the number of optical components involved.

A high-speed optical cell (packet) switch (Optical ATM: Optical Asynchronous Transfer Mode) is now receiving attention as a large-capacity optical switch system of the next generation.

FIG. 1 shows an optical signal multiplexer for use in such a high-speed optical cell switch. In FIG. 1 ultrashort optical pulse modulating equipments $21_1$ through $21_N$ yield at regular intervals optical packet signals $P_{11}$, $P_{12}, \ldots; P_{21}, P_{22}, \ldots; \ldots; P_{N1}, P_{N2}, \ldots$, respectively. The optical packet signals are each composed of a string of a predetermined number of bits, for example, m information bits or optical pulses. The optical packet signals are applied to, for instance, optical fiber delay lines $22_1$ through $22_N$, respectively, by which they are delayed relative to one another for a fixed time Td a little longer than the packet length as shown at rows A to D in FIG. 2. The optical packet signals of the respective channels, output from the optical fiber delay lines $22_1$ to $22_N$, are multiplexed by an optical coupler 23, from which are provided such multiplexed optical packet signals $P_{11}$, $P_{21}, \ldots, P_{N1}, P_{12}, P_{22}, \ldots$ as shown at row E in FIG. 2.

The ultrashort optical pulse modulating equipments $21_1$ through $21_N$ each converts an input electrical signal into an optical packet signal. It is desired, for large-capacity optical switching, that the optical pulse interval in each packet be minimized (about the same as the optical pulse width, for example) to reduce the packet length to thereby increase the number of multiplexing channels. To meet this requirement, there has been proposed such optical pulse modulating equipment as shown in FIG. 3, which produces a modulated optical pulse train of a very short pulse interval. A pulse generator 10, which is supplied with an input electrical signal S composed of information bits of a period T as shown at row A in FIG. 4, regenerates clock signals from the information bits and generates drive pulses Dp of a period mT in synchronism with the clock signals as depicted at row B in FIG. 4. A laser 11 is driven by the drive pulses Dp to generate optical pulses Lp (the same as those shown at row B in FIG. 4), which are applied to an optical splitter 12. The optical splitter 12 splits each optical pulse into channels of the same number m as the bits of each packet, through which the optical pulses are applied to external modulators $13_1$ to $13_m$, respectively.

On the other hand, the information bits of the input electrical signal S are sequentially applied to a shift register 16 having shift stages of the same number as the bits of one packet (i.e. m stages). Upon each application of the information bits of one packet to the shift register 16, outputs of its respective stages are simultaneously provided as modulation signals to the corresponding external modulators $13_1$ to $13_m$ in synchronism with the optical pulses Lp. The external modulators $13_1$ through $13_m$ are each formed by an optical switch, for instance, which modulates the optical pulse in accordance with the modulation signal by passing therethrough or cutting off the optical pulse, depending on whether the modulation signal is high-level or low-level. Assuming, for the sake of brevity, that the modulation signals applied to the external modulators $13_1$ through $13_m$ are all high-level, the modulated optical pulses (all high-level) are applied to optical fiber delay lines $14_1$ through $14_m$ of the respective channels, by which they are sequentially delayed for a time $\tau$ relative to one another as shown at rows C to F in FIG. 4. The optical pulses thus delayed are multiplexed by an optical coupler 15 into a string of m optical pulses of a constant period $\tau$ as depicted at row G in FIG. 4. The delay time $\tau$ is set to, for example, about twice the width of each ultrashort optical pulse Lp. Letting the length of the shortest optical fiber delay line $14_1$ be represented by L, the lengths of the optical fiber delay lines $14_1$ to $14_m$ for providing such a relative delay $\tau$ are L, $\tau \cdot C/n_f$, $2\tau \cdot C/n_f + L, \ldots$, $(m-1)\tau \cdot C/n_f + L$, respectively, where C is the velocity of light in a vacuum and $n_f$ is the refractive index of the fiber core.

As will be appreciated from comparison of rows A and G in FIG. 4, the train of pulses of the input electrical signal S, which are of the period T, is converted by the optical pulse modulating equipment of FIG. 3 into the train of optical pulses of the period $\tau$, whereby it is output as an optical packet signal of a packet length $m\tau$ compressed from the packet length mT of the input electrical signal S. The optical packet signal thus compressed is multiplexed with optical packet signals from other optical pulse modulating equipment as referred to previously in respect of FIGS. 1 and 2. Incidentally, in the optical pulse modulating equipment shown in FIG. 3, since the output optical pulses from the laser 11 are split by the optical splitter 12 into m channels, the power of the optical pulse in each channel is reduced to 1/m the input optical pulse, and consequently, the power level of each optical pulse of the optical pulse string output from the optical coupler 15 is also reduced to 1/m or less. A similar loss also occurs in the optical coupler 15. Moreover, assuming that the number m of bits of each optical packet is $m = 2^9 = 512$, it will be necessary to employ 512 external modulators $13_1$ to $13_m$ and 512 optical fiber delay lines $14_1$ to $14_m$, and consequently, the number of components used is very large, resulting in the optical pulse modulating equipment inevitably becoming bulky. In the case of $m = 2^9$, the optical splitter 12 calls for a tree structure involving $2^9 - 1 = 511$ optical splitters (hereinafter referred to as 1:2 optical splitters) each of which splits input light into two, and the optical coupler 15 also calls for a similar tree structure. Letting $m = 2^n$, where n is a positive integer, the number of optical elements needed for forming the optical splitter 12 and the optical coupler 15 is $2 \times (2^n - 1) = 2^{n+1} - 2$. The larger the numbers of 1:2 optical splitters and 2:1 optical couplers, the more the loss of optical power. Hence, such a large number of optical elements used is not preferable.

SUMMARY OF THE INVENTION

It is therefore an object of the present invention to provide ultrashort optical pulse modulating equipment which is small in the numbers of optical elements and optical delay lines used, and hence is small and low-cost.

Another object of the present invention is to provide ultrashort optical pulse modulating equipment of low optical power loss.

According to the present invention, there is provided ultrashort pulse modulating equipment which includes: pulse generating means for generating an electrical pulse string in synchronism with input electrical signals; optical pulse generating means which is supplied with the electrical pulse string to generate an optical pulse string corresponding thereto; optical modulating means for sequentially modulating the optical pulse string by the input electrical signals; and optical packet generating means for time compressing the pulse interval in the modulated optical pulse string produce a compressed packet of optical pulses. The optical packet generating means includes: a plurality of cascade-connected stages of pulse interval compressing means each including a plurality of optical delay line means whereby optical pulse groups are delayed for different periods of time, optical switch means whereby optical pulse groups input thereto are switched one by one to the plurality of optical delay line means, cyclically, and optical coupler means whereby the optical pulses output from the optical delay line means are coupled together for output as a train of optical pulse groups; and control signal generating means for generating control signals on the basis of the electrical pulses from the above-mentioned pulse generating means with which switching of the optical switch means of the plurality of stages of pulse interval compressing means is controlled.

According to the present invention, only one optical modulator is needed, because optical pulse trains are modulated prior to their time compression. Moreover, since the pulse interval compressing means of each stage switches the input optical pulse groups by the optical switch means to the respective optical delay line means to output them therethrough, the power of each optical pulse is not divided and hence is retained. Further, since the plurality of stages of pulse interval compressing means are cascade-connected, it is possible to implement ultrashort optical pulse modulating equipment which is capable of generating an optical packet signal of a high compression ratio through use of smaller numbers of optical elements and optical delay lines than in the prior art, as will be described later in detail.

DETAILED EXPLANATION OF PREFERRED EMBODIMENT

Figure 5:
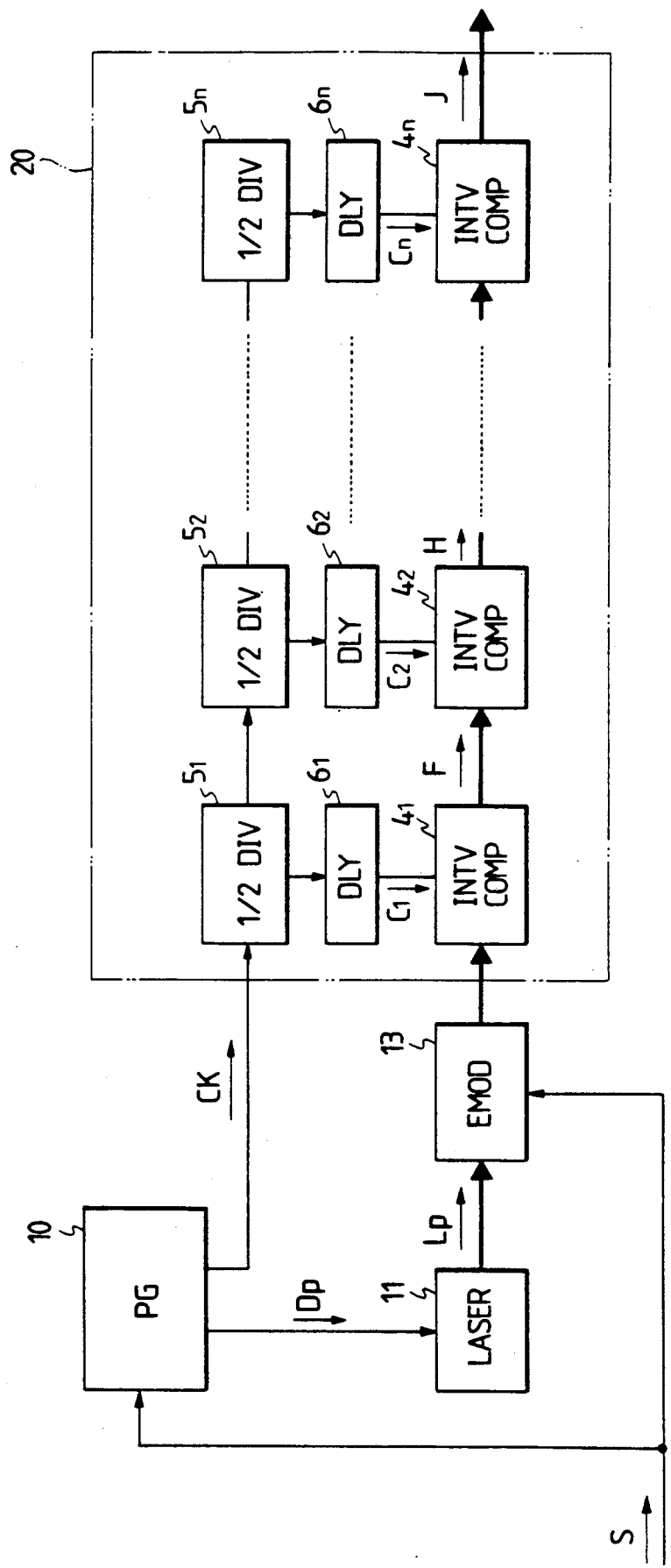
FIG. 5 is a block diagram illustrating the ultrashort optical pulse modulating equipment of the present invention.

FIG. 5 illustrates in block form an embodiment of the ultrashort optical pulse modulating equipment according to the present invention. As shown in FIG. 5, the ultrashort optical pulse modulating equipment of this embodiment is made up of a pulse generator 10 which regenerates clock pulses CK from an input electrical signal S of a period T and generates electrical drive pulses Dp each in synchronism with the clock pulses CK, a laser 11 which is driven by the drive pulse train Dp to generate an optical pulse train Lp, an external modulator 13 which is supplied with the optical pulse train Lp and modulates the optical pulses in accordance with the input electrical signal S, and an optical packet generator 20 which is supplied with the modulated optical pulse train and compresses the time intervals of the input optical pulses every predetermined number of optical pulses forming an optical packet to thereby generate compressed optical packets each composed of a train of optical pulses of a period $\tau$. The external modulator 13 is formed by, for example, an optical switch which passes therethrough or blocks the input optical pulse, depending on whether the level of the input electrical signal S is high or low.

Figure 6:
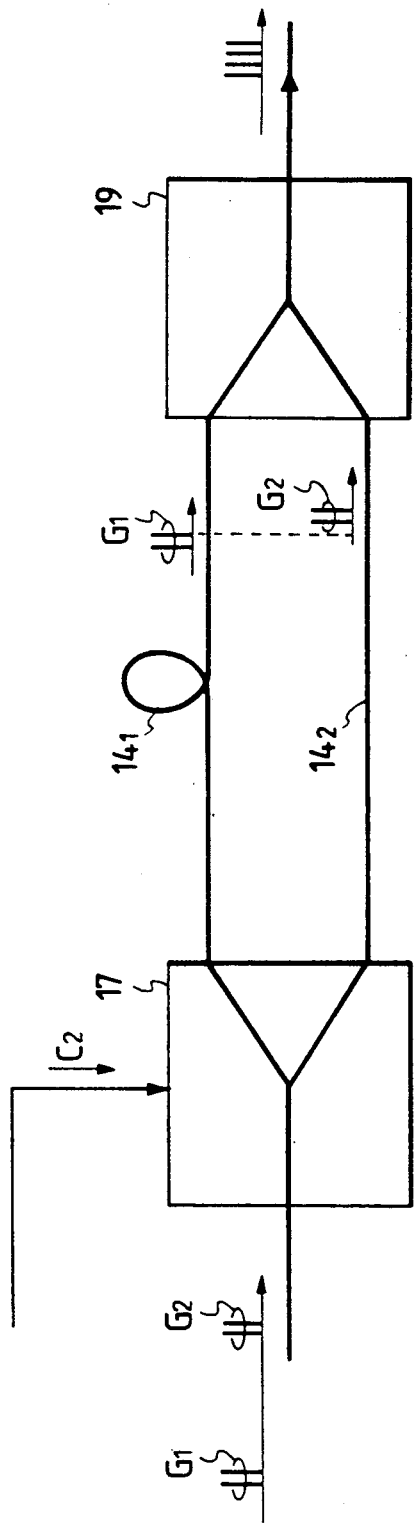
FIG. 6 is a block diagram showing an example of the construction of each pulse interval compressor for use in the ultrashort optical pulse modulating equipment depicted in FIG. 5.

The optical packet generator 20 has an arrangement in which the input optical pulses or optical pulse groups are brought close to each other two by two by each of n cascade-connected pulse interval compressors $4_1$ through $4_n$, whereby the input optical pulses are compressed in their time intervals, for example, every m bits forming each optical packet. The pulse interval compressors $4_1$ through $4_n$ are all identical in construction, and one of them is constructed as shown in FIG. 6, for instance. In FIG. 6 a train of modulated optical pulses or a train of modulated optical pulse groups are applied to a 1×2 optical switch 17. Here, the second-stage pulse interval compressor $4_2$ will be described. Assume that optical pulse groups $G_1, G_2, \ldots$, each composed of two successive modulated optical pulses of the period $\tau$, are applied from the preceding stage with a period of 2T as shown at row B in FIG. 7. If a group composed of one optical pulse is also called a group, then the following description will apply to the pulse interval compressors $4_1$ through $4_n$ of all the stages. The optical groups $G_1, G_2, \ldots$ are alternately distributed by the optical switch 17 to optical delay lines $14_1$ and $14_2$ in accordance with the ON/OFF state of a control signal $C_2$ shown at row A in FIG. 7. The thus distributed optical pulse groups are delayed by the optical delay lines $14_1$ and $14_2$ for periods of time $d_1$ and $d_2$, respectively. The delay times $d_1$ and $d_2$ are determined by adjusting the lengths of optical fibers of the optical delay lines $14_1$ and $14_2$ so that the optical pulse groups $G_1$ and $G_2$ are contiguous with the period $\tau$ as depicted at rows C and D in FIG. 7. As will be seen from FIG. 7, $d_1 = 2T + 2\tau = d_2$ in the second-stage pulse interval compressor $4_2$ and $d_1 - 2^n \times T + 2^n \times \tau = d_2$ in the nth-stage pulse interval compressor $4_n$. The optical pulse groups $G_1$ and $G_2$ thus delayed are coupled by an optical coupler 19, from which they are each supplied, as a new optical pulse group composed of four modulated optical pulses, to the next-stage pulse interval compressor $4_3$ with a period of 4T, wherein the interval between every two successive pulse groups is to be compressed to provide an optical pulse group composed of eight modulated optical pulses. In general term, a jth-stage (where $1 \leq j \leq n$) pulse interval compressor $4_j$ is supplied with a train of optical pulse groups each composed of $2^{j-1}$ modulated Optical pulses of the period $\tau$ and brings them close to each other every two groups, thereby creating an optical pulse group composed of $2^j$ modulated optical pulses.

Figure 7:
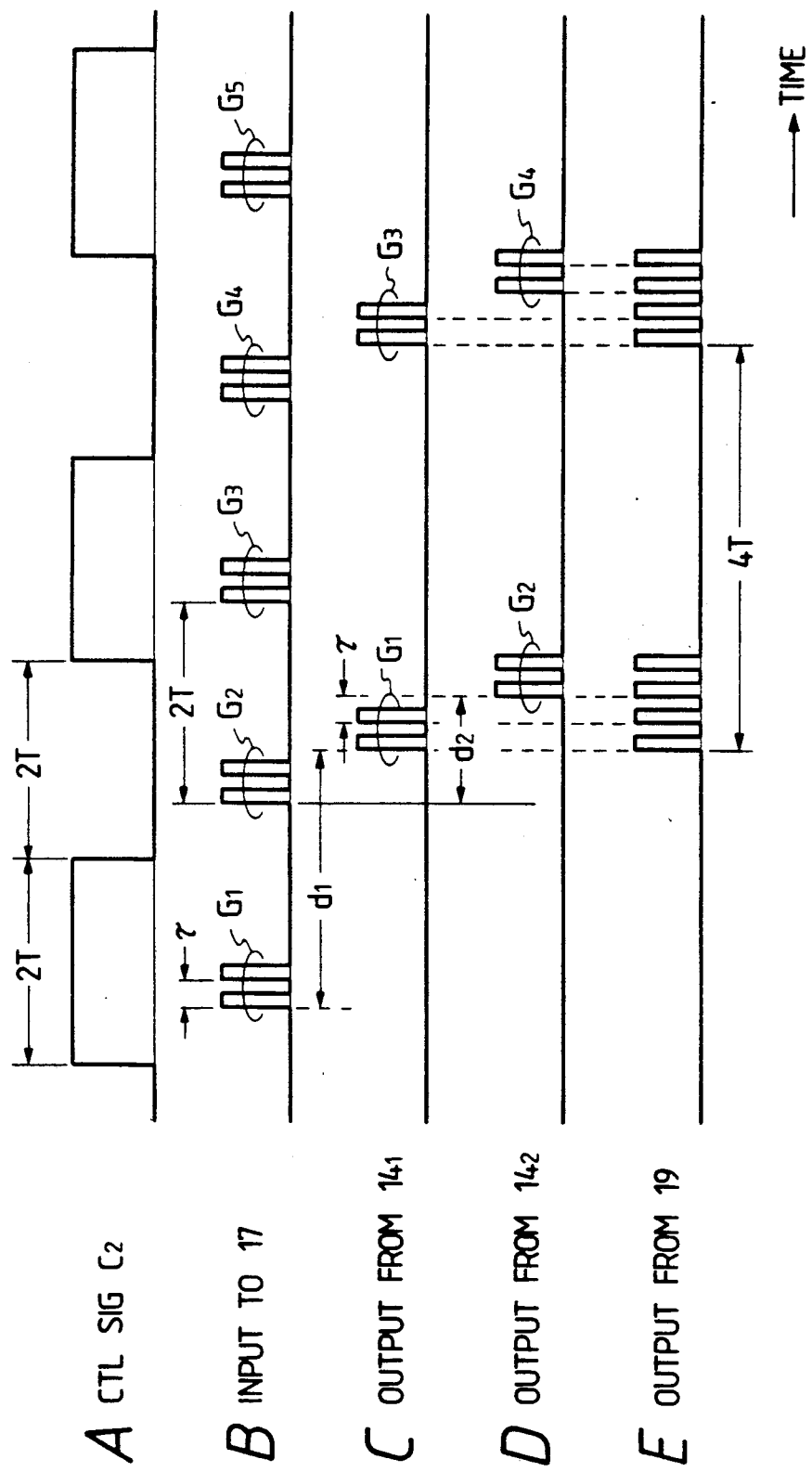
FIG. 7 is a timing chart for explaining the operation of the pulse interval compressor shown in FIG. 6.

The control signal $C_2$ for controlling the switching of the optical switch 17 turns ON and OFF at intervals of 2T (i.e. with a period of 4T) in the case of the pulse interval compressor $4_2$ which operates as shown in FIG. 7, and as will be seen from the above, the pulse interval compressor $4_3$ of the next stage is supplied with a control signal $C_3$ which turns ON and OFF with a period of 8T. That is, the periods of the control signals $C_1$ to $C_n$ which are applied to the pulse interval compressors $4_1$ to $4_n$ in FIG. 5 are set to 2T, 4T, ..., $2^n$T, respectively. The control signals $C_1$ to $C_n$ are produced by frequency dividing the clock pulses CK of the period T from the pulse generator 10 by cascade-connected $\frac{1}{2}$ frequency dividers $5_1$ to $5_n$ one after another. The outputs of the respective stages of the $\frac{1}{2}$ frequency dividers $5_1$ to $5_n$ are applied as the control signals $C_1$ to $C_n$ to the pulse interval compressors $4_1$ to $4_n$ via delay circuits $6_1$ to $6_n$, respectively. Each of the delay circuits $6_1$ to $6_n$, or delay circuit $6_2$, for example, is to adjust the timing of, for example, the control signal $C_2$ so that it turns ON and OFF in the time interval between adjacent optical pulse groups $G_1, G_2, \ldots$ shown at row B in FIG. 7 which are provided to the optical switch 17 of the pulse interval compressor $4_2$.

Figure 8:
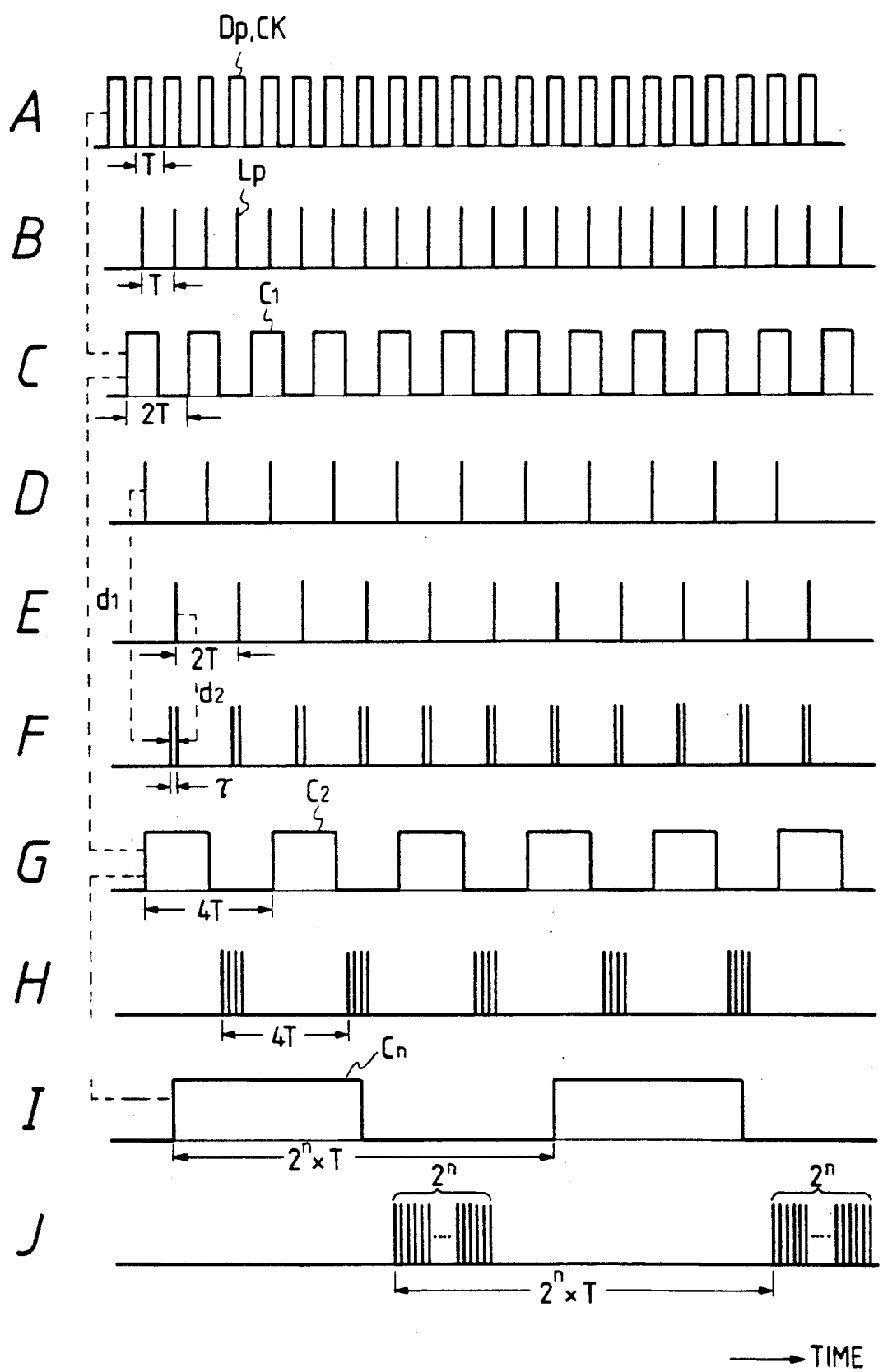
FIG. 8 is a timing chart for explaining the operation of the ultrashort optical pulse modulating equipment of the present invention.

Next, a description will be given, with reference to FIG. 8, of the operation of the ultrashort optical pulse modulating equipment shown in FIG. 5. In FIG. 8, row A shows the drive pulse train Dp or the clock CK generated by the pulse generator 10; row B shows the optical pulse train Lp emitted from the laser 11; row C shows the control signal $C_1$ for the first-stage pulse interval compressor $4_1$; row D shows the optical pulse train for input into the optical fiber delay line $14_1$ of the pulse interval compressor $4_1$; row E shows the optical pulse train for input into the optical delay line $14_2$ of the pulse interval compressor $4_1$; row F shows the output optical pulse train F from the pulse interval compressor $4_1$ (i.e. the output optical pulse train from the optical coupler 19); row G shows the control signal $C_2$ for the second-stage pulse interval compressor $4_2$; row H shows the output optical pulse train H from the pulse interval compressor $4_2$; row I shows the control signal $C_n$ for the nth-stage pulse interval compressor $4_n$; and row J shows the output optical pulse train J from the pulse interval compressor $4_n$.

The drive pulses Dp of the period T (row A in FIG. 8) are applied from the pulse generator 10 to the laser 11, which is driven by them to emit the ultrashort optical pulse train Lp of the period T (row B in FIG. 8). The optical pulse train Lp is provided to the external modulator 13, wherein it is modulated by the electrical signal S. The following description will be given on the assumption that electrical signals which are applied to the external modulator 13 are all high-level. Accordingly, the output optical pulse train Lp (of the period T) from the laser 11 is applied intact to the optical packet generator 20. The modulated optical pulses Lp of the period T are provided to the optical switch 17 (see FIG. 6) of the first-stage pulse interval compressor $4_1$, by which they are alternately applied one by one to the optical fiber delay lines $14_1$ and $14_2$ (rows D and E in FIG. 8) under control of the control signal $C_1$ which turns ON and OFF at intervals of T as shown at row C in FIG. 8. The modulated optical pulses which pass through the optical fiber delay lines $14_1$ and $14_2$ are delayed for the periods of time $d_1$ and $d_2$, respectively, so that output optical pulses from the delay lines are close to each other and each pair of corresponding optical pulses has a period $\tau$. The optical pulse trains derived from the optical fiber delay lines $14_1$ and $14_2$ are coupled together by the optical coupler 19 into a train of optical pulse groups as shown at row F in FIG. 8, and it is applied to the pulse interval compressor $4_2$ of the next stage.

The pulse interval compressor $4_2$ is supplied with the control signal $C_2$ (row G in FIG. 8) which turns ON and OFF at intervals of 2T as referred to previously. The optical pulse groups of the period 2T (row F in FIG. 8), each composed of two modulated optical pulses, are alternately applied one by one via the optical switch to the optical fiber delay lines $14_1$ and $14_2$ under control of the control signal $C_2$ (row G in FIG. 8). The output optical pulse groups from the optical delay lines $14_1$ and $14_2$ are coupled together by the optical coupler 19 into a train of optical pulse groups of a period 4T, each composed of four modulated optical pulses of the period $\tau$ as depicted at row H in FIG. 8. Similar pulse interval compression processing is performed also in the pulse interval compressor of the subsequent stages.

The pulse interval compressor $4_n$ of the nth stage (the final stage) is supplied with the control signal $C_n$ of the period $2^n \times T$ (row I in FIG. 8), and in the same manner as described above, the group intervals are compressed so that the input optical pulse groups follow one after the other in pairs. As a result of this, each optical pulse group composed of $2^n$ modulated optical pulses of the period $\tau$ as shown at row J in FIG. 8 is provided as a compressed optical packet signal.

Figure 1:
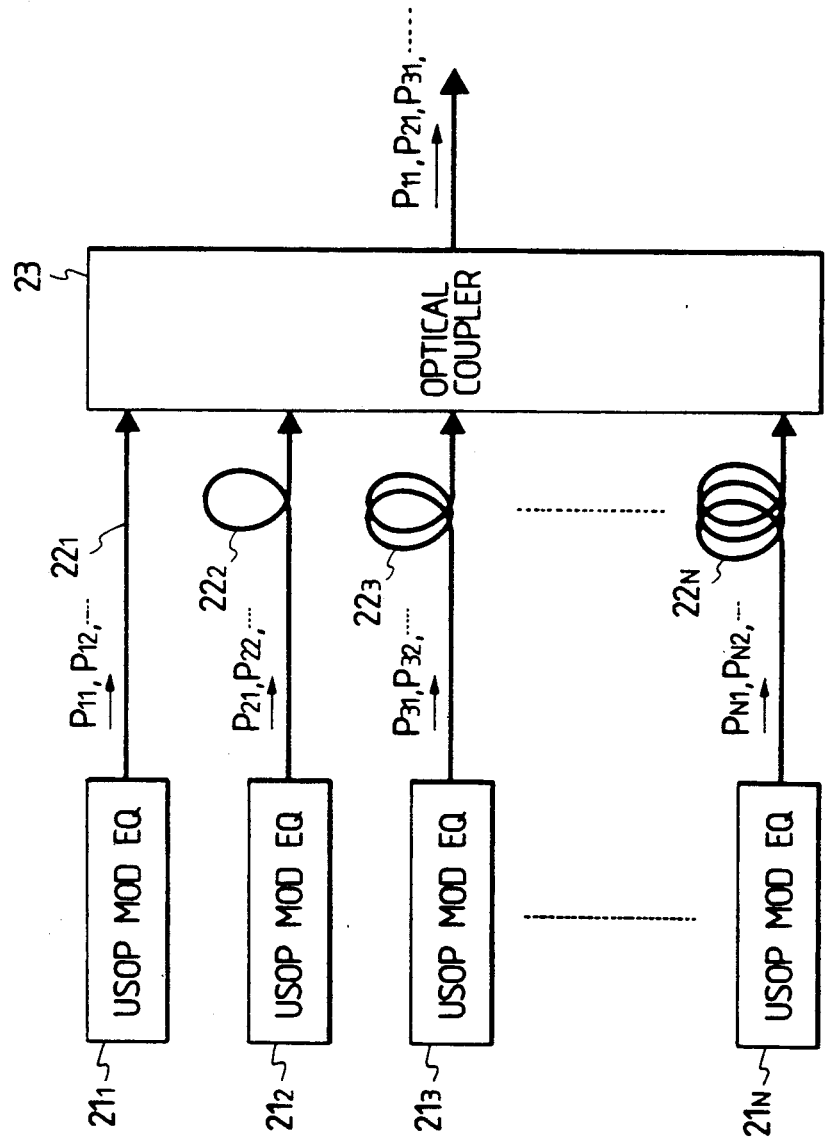
FIG. 1 is a block diagram showing a conventional optical signal multiplexer.
Figure 2:
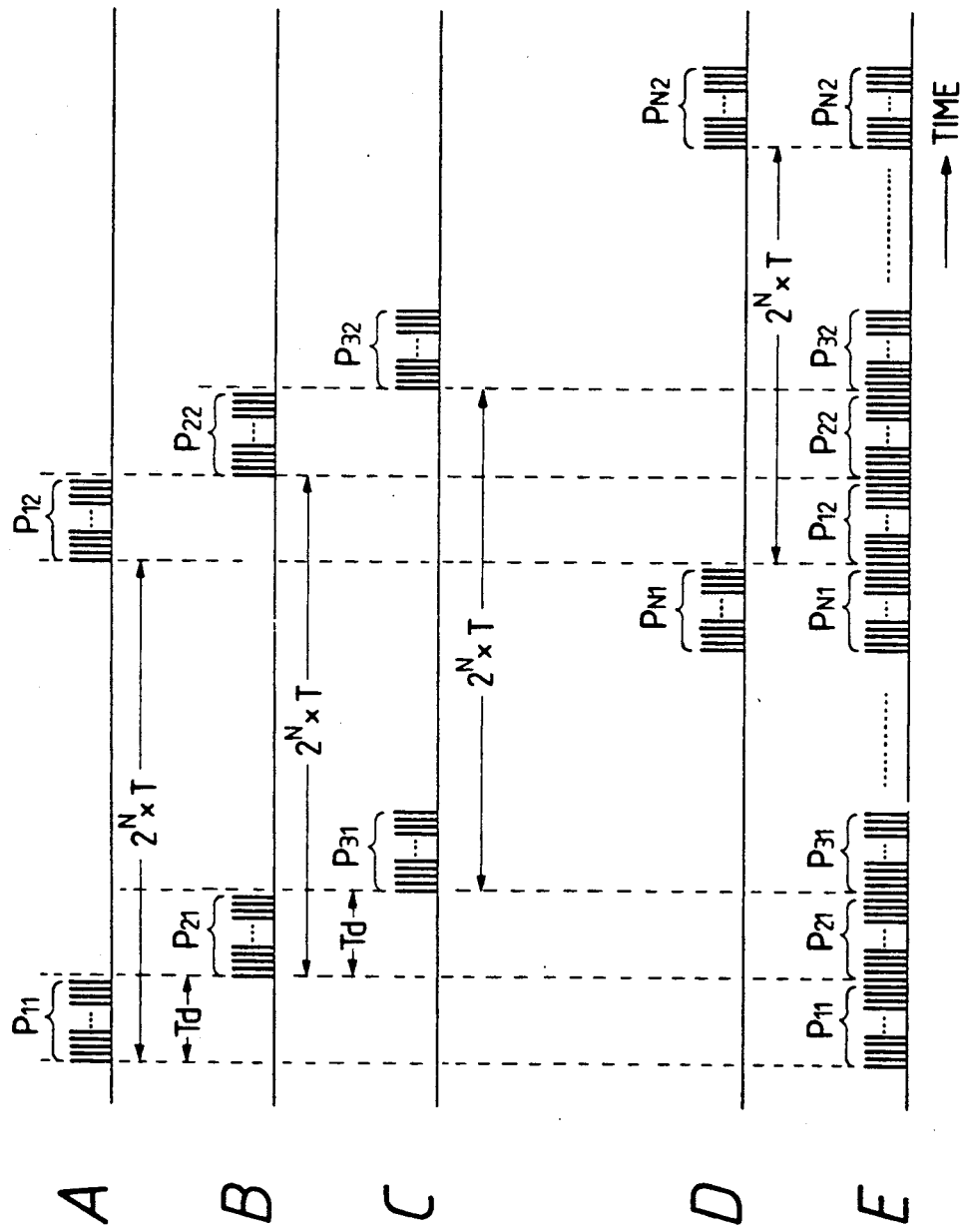
FIG. 2 is a timing chart for explaining the operation of the conventional optical signal multiplexer depicted in FIG. 1.

As described above, the ultrashort optical pulses of the period T, modulated by the input electrical signal S of the period T, are compressed in their intervals to form optical packets each of which is composed of $2^n$ modulated optical pulses of the period $\tau$, and such optical pulse packets are output from the ultrashort optical pulse modulating equipment of FIG. 5 at intervals of $2^n \times T$. It is evident that such an ultrashort optical pulse modulating equipment can be applied to the optical signal multiplexer shown in FIG. 1. Incidentally, the optical switch 17, by which input optical pulse groups are alternately switched one by one to the two optical delay lines $14_1$ and $14_2$ in each of the pulse interval compressors $4_1$ to $4_n$ shown in FIG. 6, does not cause the 3 dB loss inherent in the 1:2 optical splitter which forms the optical splitter 12 in FIG. 3, and consequently, the power level of the input optical pulses is held when they are alternately switched to the optical delay lines $14_1$ and $14_2$. The equipment of the present invention also employs the optical coupler 19 (FIG. 6), which causes an optical power loss of 3 dB. In the following table I there are compared the conventional equipment of FIG. 3 and this invention equipment of FIG. 5 in the case where the number of bits m forming each optical packet in the former is equal to the number of bits $2^n$ forming the optical packet in the latter, that is, where $m=2^n$.

TABLE I

Figure 3:
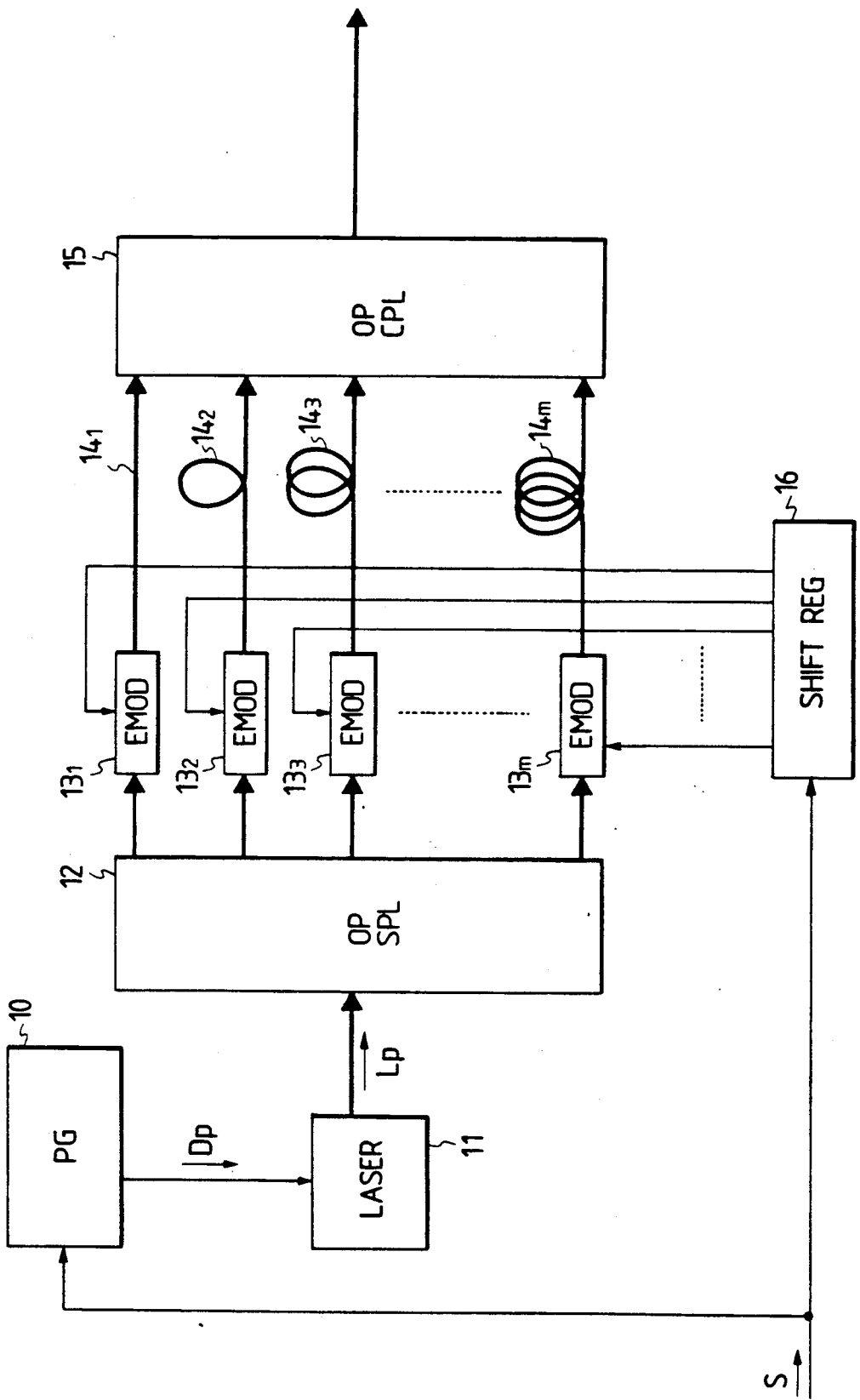
FIG. 3 is a block diagram showing conventional ultrashort optical pulse modulating equipment for use in the optical signal multiplexer depicted in FIG. 1.
Figure 4:
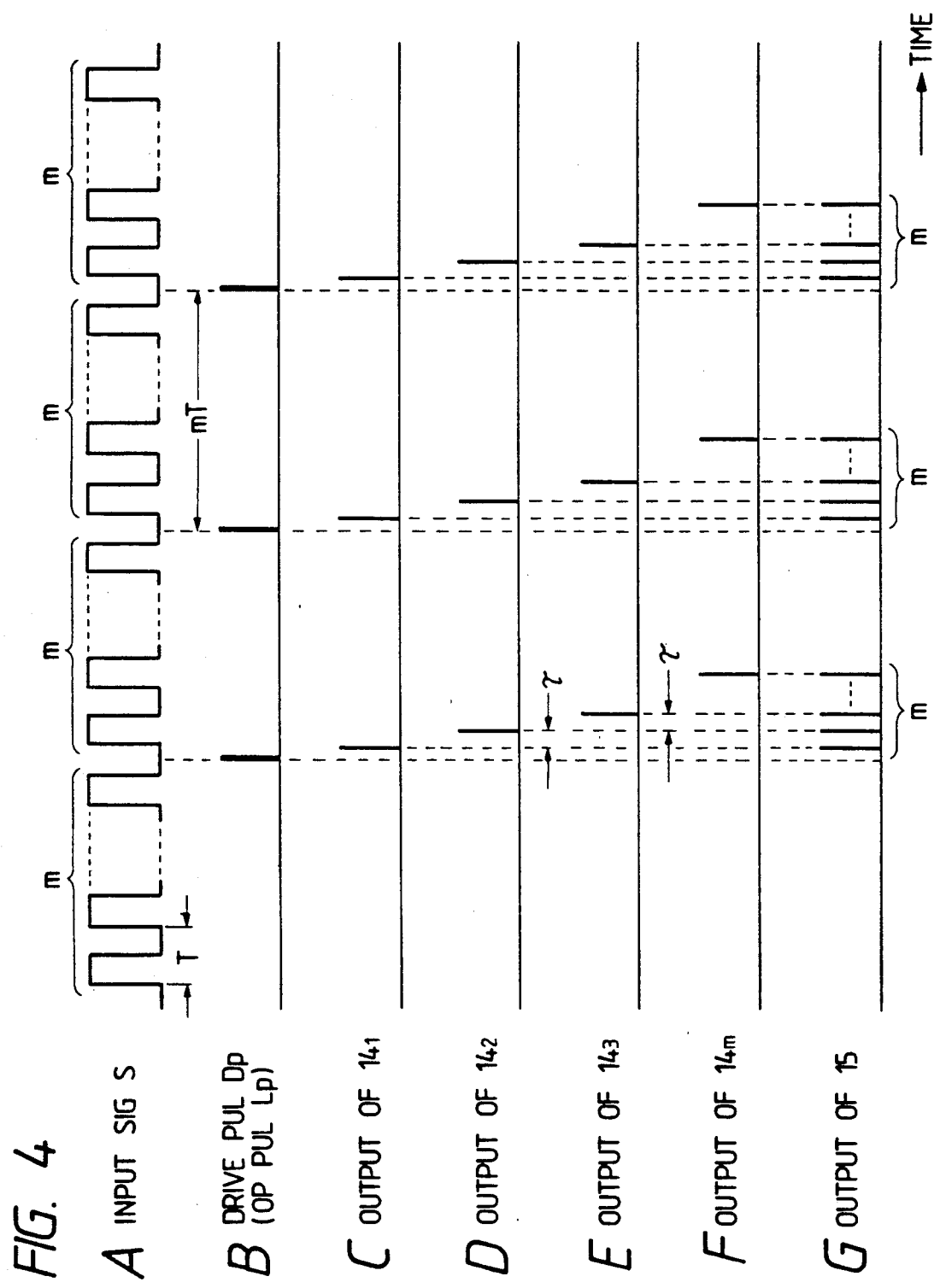
FIG. 4 is a timing chart for explaining the operation of the ultrashort optical pulse modulating equipment shown in FIG. 3.

|  | FIG. 3 $m = 2^n$ | FIG. 5 |
| --- | --- | --- |
| Number of optical delay lines | Optical delay lines $14_1$ to $14_m$: $2^n$ | Optical delay lines $14_1$ and $14_2$, n stages $2n$ |
| Number of external modulators | $2n$ | 1 |
| Number of optical elements | 1:2 optical splitters: $2^n-1$, 2:1 optical couplers: $2^n-1$ total of $2^{n-1}-2$ | Switches: n, 2:1 optical couplers: n total of $2n$ |
| Optical power loss in dB | 6n (by optical splitters and couplers) | 3n (by optical couplers) |

As shown in Table I, if $n \geq 3$, the numbers of optical delay lines, external modulators and optical elements needed in the ultrashort optical pulse modulating equipment of the present invention are smaller than in the prior art equipment; and as the value n increases, the constitution of the present invention becomes particularly advantageous over the prior art. Moreover, the overall optical power loss by the optical splitters and the optical couplers according to the equipment of the present invention is always smaller in the optical power loss than the conventional equipment for $n \geq 1$.

Figure 9:
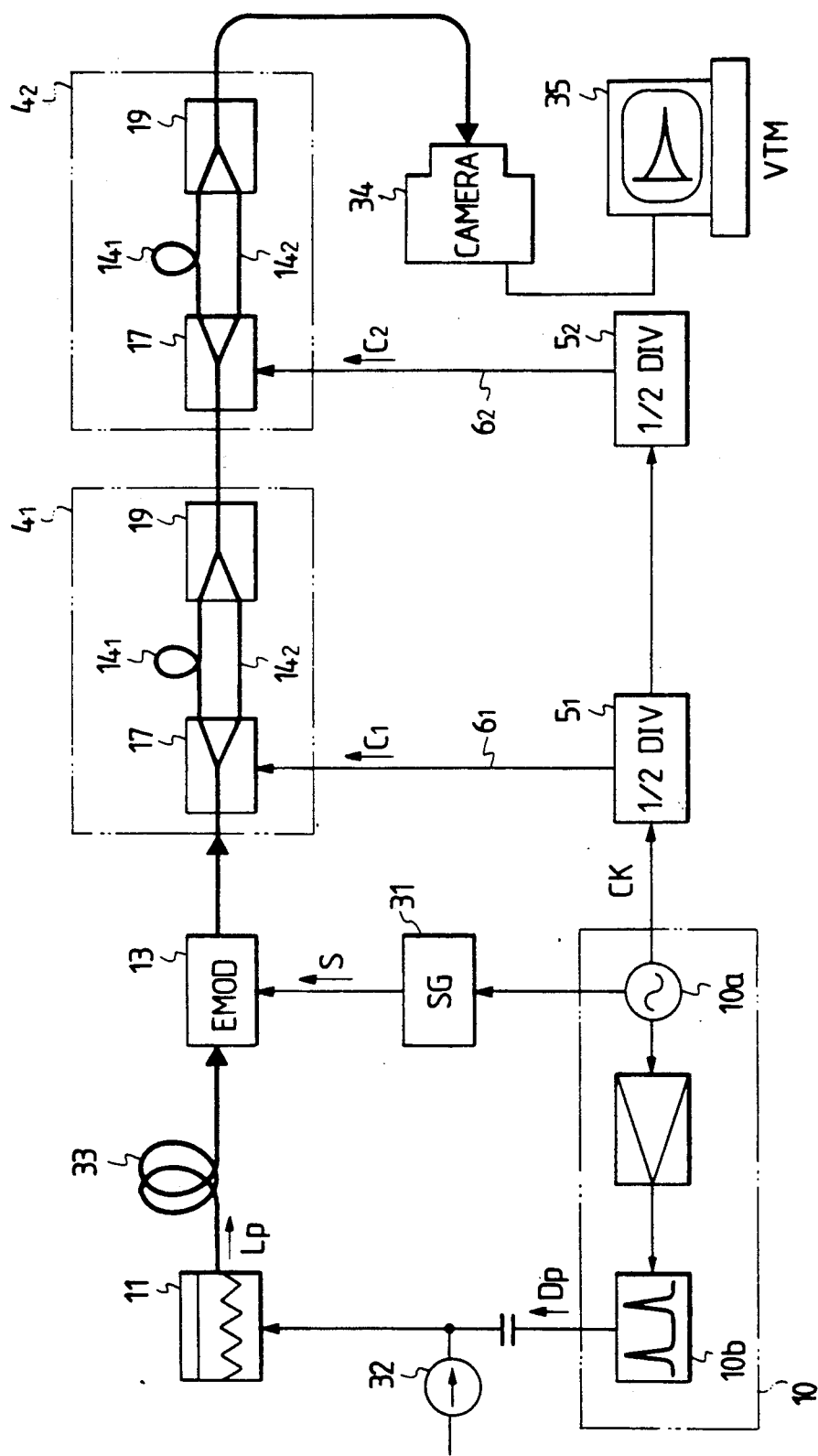
FIG. 9 is a block diagram showing an experimental configuration used for confirming the operation of the ultrashort optical pulse modulating equipment of the present invention.

Next, a brief description will be given of an experiment conducted on the ultrashort optical pulse modulating equipment of the present invention. FIG. 9 shows in block form an experimental version of the equipment actually constructed with $n=2$ so as to confirm its operation.

Clock pulses CK of 1 GHz are generated by a synthesizer 10a in the pulse generator 10 and drive pulses Dp are generated by a comb generator 10b on the basis of the clock pulses CK. The drive pulses Dp are applied to a DFB laser 11, together with a bias current from a current source 32, causing the laser diode 11 to produce short-width optical pulses by a so-called gain switching method of a semiconductor laser. The optical pulses are subjected to linear pulse width compression by a dispersion shifted fiber 33 to obtain ultrashort optical pulses Lp each having a pulse width (a full width at half maximum) of 22 ps and a repetition frequency of 1 GHz. On the other hand, the clock pulses CK from the synthesizer 10a are applied to a signal generator 31 to thereby generate signals S synchronized with the clock pulses CK. The signals S are provided to the external modulator 13 for intensity modulating the optical pulses Lp in accordance with the ON/OFF state (high/low level) of the signals S. In this experiment the signals S were all high-level. The modulated optical pulses are applied to the first-stage pulse interval compressor $4_1$, wherein they are alternately switched one by one to the two optical fiber delay lines $14_1$ and $14_2$ by the $1 \times 2$ optical switch 17. The control signals $C_1$ and $C_2$ to the switches 17 are signals of 500 and 250 MHz, obtained by sequentially frequency dividing the clock pulses CK from the synthesizer 10a by the ½ frequency dividers $5_1$ and $5_2$. The control signals $C_1$ and $C_2$ are timed by adjusting the lengths of the delay lines $6_1$ and $6_2$ and are provided to the two optical switches 17, respectively. The optical pulses delayed by the optical fiber delay lines $14_1$ and $14_2$ of the pulse interval compressor $4_1$ are coupled together by the optical coupler 19, whereby optical pulse groups, each composed of two closely spaced optical pulses, are created at a repetition frequency of 500 MHz. The optical pulse groups are further provided to the next-stage pulse interval compressor $4_2$, by which optical pulse groups, each composed of four closely spaced optical pulses, are produced at a repetition frequency of 250 MHz. The optical pulse trains thus obtained were detected by a streak camera 34 and observed on a television monitor 35, and as a result of this, it was confirmed that optical packets (i.e. cells) of 25 Gb/s had been generated.

It is evident that the pulse interval compressor shown in FIG. 6 may be of an arrangement in which the $1 \times 2$ optical switch 17 is replaced by a $1 \times k$ optical switch (where k is an integer equal to or greater than 2) so that input optical pulses or optical pulse groups are sequentially applied to k optical delay lines $14_1$ to $14_k$. In such an instance, a jth-stage (where $1 \leq j \leq n$) pulse interval compressor $4_j$ is supplied with optical pulse groups each composed of $M_j$ (where $M_1 = 1$) modulated optical pulses of the period $\tau$, and the optical groups are sequentially applied to and properly delayed by the k optical delay lines $14_1$ to $14_k$ and then coupled together by the optical coupler 19, thereby producing optical pulse groups each composed of $M_{j+1} = k \times M_j$ consecutive modulated optical pulses of the period $\tau$.

As described above, according to the present invention, since the pulse intervals are compressed cumulatively by applying optical pulses to n series-connected pulse interval compressors one after another, the structure for pulse interval compression can be made markedly smaller than the conventional structure involving parallel processing. Hence, the ultrashort optical pulse modulating equipment can be made small and low-cost accordingly. Moreover, each pulse interval compressor employs the $1 \times k$ optical switch instead of using an optical splitter so that optical pulses or optical pulse groups are applied one by one to a plurality of optical delay lines, and hence the optical power loss throughout the equipment is small.

It will be apparent that many modifications and variations may be effected without departing from the scope of the novel concepts of the present invention.

What is claimed is:

1. Ultrashort optical pulse modulating equipment comprising:

pulse generating means for generating drive pulses and clock pulses of a period T in synchronism with electrical signals;

laser means supplied with said drive pulses from said pulse generating means, for outputting optical pulses of the period T;

external optical modulating means for modulating said optical pulses from said laser means by said electrical signals and outputting said modulated optical pulses; and optical packet generating means supplied with a train of said modulated optical pulses from said external optical modulating means, for time compressing said modulated optical pulse train every m modulated optical pulses and outputting said every m modulated optical pulses as a modulated pulse packet;

wherein said optical packet generating means includes:

n cascade-connected pulse interval compressing means, n being an integer equal to or greater than 2, a jth one of said pulse interval compressing means including: k optical delay means for causing different delays in modulated optical pulse groups input thereinto, j being $1 \leq j \leq n$ and k being an integer equal to or greater than 2; optical switching means supplied with modulated optical pulse groups each composed of $M_j$ modulated optical pulses, for switching said modulated optical pulse groups one by one to said k optical delay line means one after another; and optical coupler means for optically coupling k modulated optical pulse groups from said k optical delay line means and outputting them as one modulated optical pulse group composed of $M_{j+1} = k \times M_j$ modulated optical pulses, $M_1$ being equal to 1; and control signal generating means responsive to said clock pulses from said pulse generating means to generate n control signals for controlling the switching operation of said optical switching means of said n pulse interval compressing means, respectively.

2. The ultrashort optical pulse modulating equipment of claim 1, wherein the number k of said optical delay line means of each of said pulse interval compressing means is 2.

3. The ultrashort optical pulse modulating equipment of claim 1, wherein said k optical delay line means of each of said pulse interval compressing means are formed by optical fibers of desired different lengths.

4. The ultrashort optical pulse modulating equipment of claim 2, wherein said two optical delay line means of said jth pulse interval compressing means causes delays $d_1$ and $d_2$ in modulated optical pulse groups, respectively, said delays $d_1$ and $d_2$ being selected to bear such a relationship that they substantially satisfy $d_1 + 2^j \cdot \tau = d_2 + 2^j \cdot T$, where $\tau$ is the period of said time-compressed modulated optical pulses forming said modulated optical pulse packet output from said optical packet generating means.

5. The ultrashort optical pulse modulating equipment of claim 2, wherein said control signal generating means includes: n cascade-connected frequency dividers for sequentially frequency dividing said clock pulses down to $\frac{1}{2}$; and n timing adjusting means for delaying the frequency-divided outputs from said n frequency dividers as desired and applying them as said control signals to said switching means of said n pulse interval compressing means, respectively.

6. The ultrashort optical pulse modulating equipment of claim 1, 2, 3, 4, or 5, further including a dispersion shifted fiber for optically connecting said laser means and said external optical modulating means to reduce the pulse width of each of said optical pulses emitted from said laser means.

* * * * *